July 3, 1934. B. BRONSON 1,964,903
COMPOSITE ARTICLE
Filed Feb. 12, 1930 2 Sheets-Sheet 1
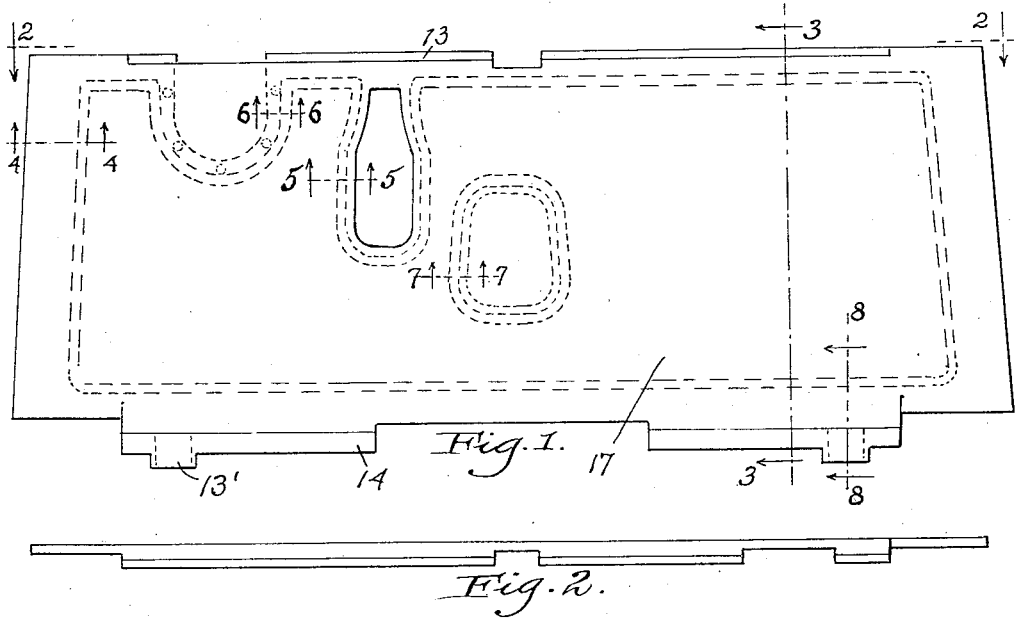
Fig. 1.
Fig. 2.
Fig. 4.
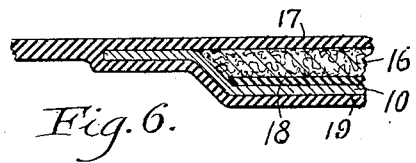
Fig. 6.
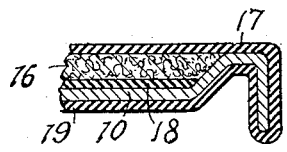
Fig. 5.
Fig. 3.
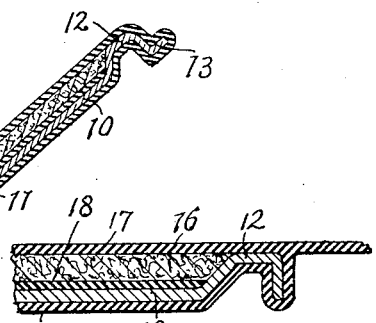
Fig. 7.
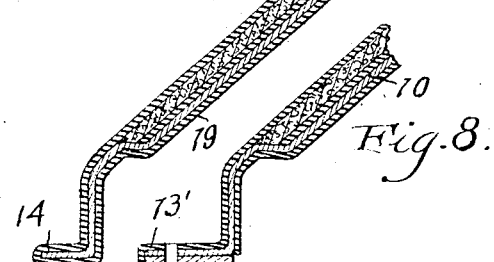
Fig. 8.
Inventor
Budd Bronson
Kwis Hudson & Kent
Attys.

July 3, 1934. B. BRONSON 1,964,903
COMPOSITE ARTICLE
Filed Feb. 12, 1930 2 Sheets-Sheet 2
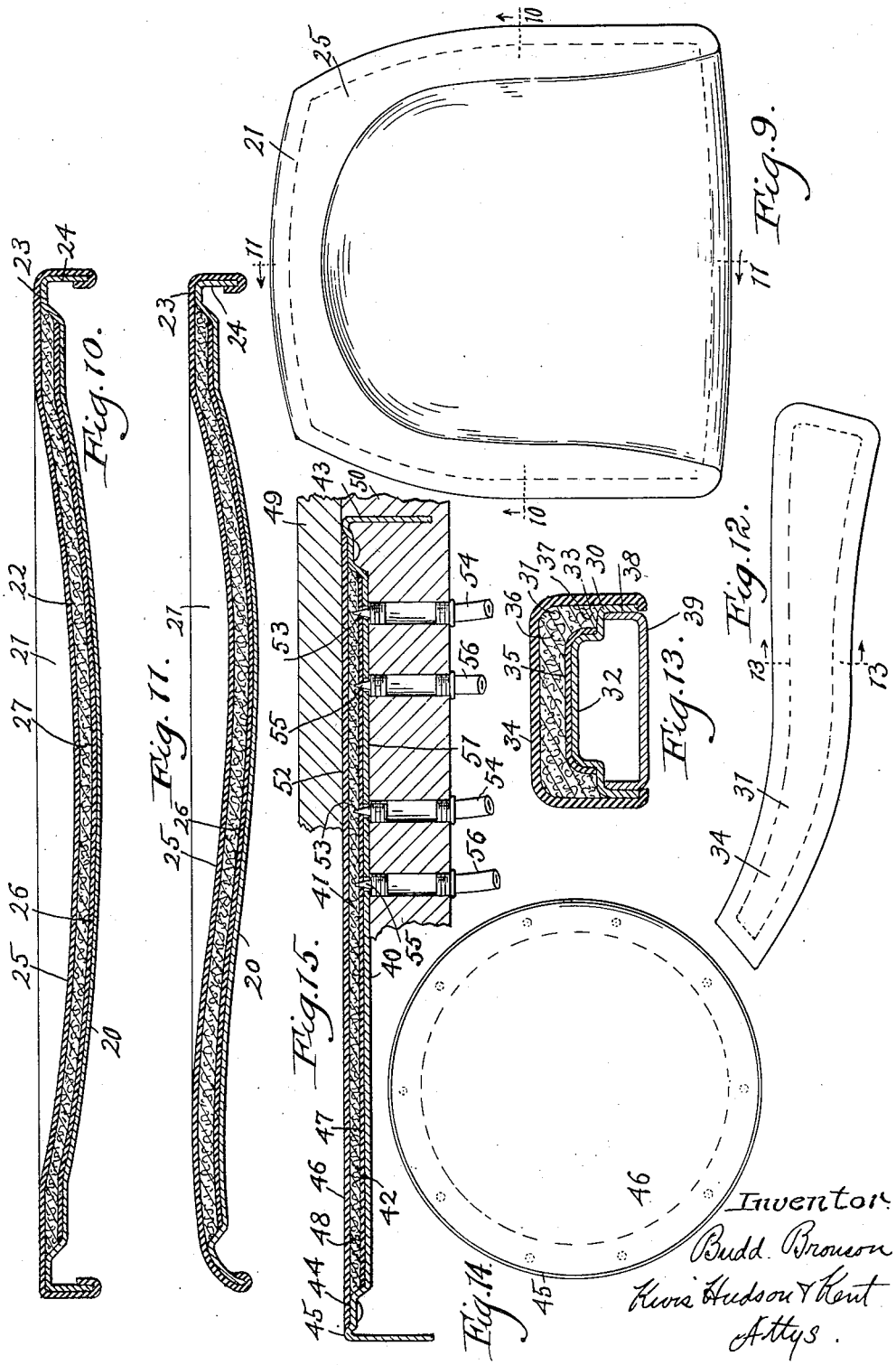
Inventor
Budd Bronson
Kwis Hudson & Kent
Attys.

Patented July 3, 1934

1,964,903

UNITED STATES PATENT OFFICE 1,964,903

COMPOSITE ARTICLE

Budd Bronson, Cleveland, Ohio, assignor to The Ohio Rubber Company, Cleveland, Ohio, a corporation of Ohio Application February 12, 1930, Serial No. 427,890

4 Claims. (Cl. 155—184)

This invention relates to composite structures, such as articles having a metallic base and a rubber covered cushion-like pad secured thereto.

Another object of this invention is to provide a novel form of composite article.

The invention may be further briefly summarized as consisting in certain novel combinations and arrangements of parts hereinafter described and particularly set out in the appended claims.

In the accompanying sheets of drawings,

Figure 1 is a top plan view of a composite article constructed according to my invention;

Fig. 2 is an edge view of the article shown in Fig. 1, taken in the direction indicated by the line 2—2;

Fig. 3 is a sectional view taken on line 3—3 of Fig. 1;

Figs. 4 to 8, inclusive, are detail sectional views, taken on their respective section lines indicated in Fig. 1;

Fig. 9 is a top plan view of another composite article constructed according to my invention;

Fig. 10 is a sectional elevational view taken on line 10—10 of Fig. 9;

Fig. 11 is a sectional view taken on line 11—11 of Fig. 9;

Fig. 12 is a top plan view of another composite article constructed according to my invention;

Fig. 13 is a sectional view taken on line 13—13 of Fig. 12;

Fig. 14 is a top plan view of still another composite article constructed according to my invention; and Fig. 15 is a view showing the article of Fig. 14 in cross section and also illustrating the method of my invention.

In the drawings, to which I shall presently refer in detail in describing my invention, I have shown, as illustrations of useful applications of my invention, several composite articles having a rubber covering attached to a layer of resilient material and to a metallic base by a single vulcanizing operation. In Figs. 1 to 8, inclusive, one of these articles is shown as a floor board for a compartment of a motor vehicle. The particular floor board illustrated in this instance usually forms the forward inclined portion of the floor of the front compartment of a motor vehicle, and is commonly known as a toe board. This toe board comprises a metallic base 10, formed as a sheet metal stamping of suitable shape to properly fit within the compartment. This metallic base, as shown in Fig. 3 is pan-shaped in form having a recess 11 surrounded by a comparatively narrow flat marginal portion 12. If desired, portions of the base may be extended beyond the marginal portion 12 to provide flanges 13, by means of which the board may be supported upon parts of the vehicle frame or body. Likewise the board may have openings therethrough to accommodate the usual vehicle controls, and may also have extensions 13' for supporting engagement with the longitudinal members of the vehicle frame, and extensions 14 for supporting one edge of an adjacent floor board.

A yielding cushion-like pad 15 fills the recess of the metalilc base and is secured thereto. This pad comprises a layer of resilient material 16, such as felt, and top and bottom sheets of rubber 17 and 18 attached to opposite surfaces thereof. The top sheet 17 is extended beyond the edges of the layer of resilient material and is attached to the metallic base along the narrow marginal portion 12 surrounding the recess. If desired, the top sheet of rubber 17 may be extended beyond the marginal portion 12 and carried around and beyond the flange 13 to form a covering of rubber 19 for the reverse side of the board. The bottom sheet of rubber 18 is attached to the metal base and to the layer of felt, and serves to prevent movement or bunching of the felt within the recess. The top sheet of rubber 17 is attached to the top surface of the layer of felt and to portions of the base, thus preventing movement of the felt and also providing an air-tight seal for the recess. The layer of felt is thus encased and securely held within an air-tight pocket so that dust and moisture cannot accumulate in the fibers of this material. Furthermore, since air cannot escape from the recess when pressure is applied to the top sheet of rubber, matting of the felt will be prevented during use of the article. The layer of felt also gives to the article heat insulating and sound deadening qualities, which make the structure very desirable for vehicle floor boards.

In Figs. 9, 10 and 11 of the drawings, I have shown a chair seat constructed as a composite article according to my invention. This seat comprises a metallic base 20, in the form of a sheet metal stamping, and a cushion-like pad 21 secured thereto. This base is of pan-shape form having a depression 22 surrounded by a comparatively narrow raised portion 23, which terminates in the depending marginal flange 24. The cushion-like pad is secured within the depression of the metal base and comprises top and bottom sheets of rubber 25 and 26 attached to opposite surfaces of a layer of resilient material 27. such as a layer of felt. The bottom sheet 26 is attached to the portion of the metal base which forms the bottom of the depression, while the top sheet 25 is extended beyond the edges of the layer of felt and is attached to the narrow portion 23. The top sheet 25 may be extended beyond the narrow portion to cover the depending flange 24 and to extend around the lower edge of this flange.

In Figs. 12 and 13, I have shown an arm rest constructed, as a composite article, according to my invention. This arm rest comprises a metallic base 30 and a cushion-like pad 31 secured thereto. The metallic base is preferably formed as a channel-shaped sheet metal stamping 32 having shoulder portions 33. The cushion-like pad 31 is attached to the base and comprises top and bottom sheets of rubber 34 and 35 secured to opposite surfaces of a layer of resilient material 36, such as a layer of felt. The bottom sheet of rubber is attached to one surface of the layer of felt and to the back of the channel-shaped base with the end portions 37 thereof abutting against the shoulder portions 33 of the base. The top sheet 34 is extended beyond the edges of the layer of felt and is attached to the depending flange portions 38 of the metallic base. If desired, the channel-shaped recess of the metallic base may be closed by telescoping a channel-shaped member 39 between the depending flanges 38 of the base.

In Figs. 14 and 15 of the drawings, I have shown a seat for a chair or stool constructed as a composite article, according to my invention. This seat comprises a substantially circular metallic base 40 and a cushion-like pad 41 secured thereto. The base is preferably constructed as a sheet metal stamping having a recess 42 therein and a depending marginal flange 43 around its outer edge. Around the edge of the recess a portion of the base extends transversely to provide the narrow annular portion 44. An annular bead 45 raised above the level of the portion 44 connects the latter with the depending flange 43. The cushion-like pad 41 comprises top and bottom sheets of rubber 46 and 47 attached to opposite surfaces of a layer of resilient material 48, such as a layer of felt. The bottom sheet 47 is also attached to the portion of the metallic base which forms the bottom wall of the recess, while the top sheet of rubber is extended beyond the edges of the layer of felt and is attached to the narrow annular portion 44. The thickness of the top sheet 46 is substantially equal to the height to which the bead 45 extends above the surface of the portion 44 so that the surface of the top sheet is substantially flush with the top of the bead 45.

The composite articles which I have described may be constructed according to any suitable method, but I have found that when sufficient pressure is applied to vulcanize and attach the sheets of rubber to the layer of felt and to the metallic base, and to mold a suitable pattern or configuration on the top sheet, the fibers of the layer of felt are matted so closely together as to almost destroy the resilient or yielding characteristic of the felt. Therefore, in molding and vulcanizing the layers of rubber and simultaneously attaching them to the layer of felt and to the metallic base, I have devised a method in which fluid pressure is maintained in the space occupied by the layer of felt during the vulcanizing operation.

In describing this method, I shall refer to Fig. 15 of the drawings, which illustrates the application of this method to the construction of one of the composite articles which I have already described. It should be understood, however, that the same method may be utilized in constructing all of the composite articles which I have described and many others. In constructing these articles, according to my method, I provide a suitable vulcanizing mold comprising cooperating top and bottom mold members 49 and 50. The bottom mold member is provided with a recess 51 suitably shaped to accommodate the metallic base of the article being made. The surface 52 of the top mold member is preferably provided with a suitable pattern or design which is to appear upon the surface of the finished article.

For introducing fluid pressure into the space occupied by the layer of felt, I provide supply nozzles 53, in suitable number, upon the upper surface of the lower mold member. These nozzles are of suitable length to extend through openings provided in the metal base 40, and through the bottom sheet of rubber 47, and into the layer of felt 48. A flexible pipe 54 is arranged to supply compressed air or other suitable fluid pressure through the nozzles into the space occupied by the layer of felt substantially simultaneously with the closing of the mold. For releasing or withdrawing the fluid pressure from the article substantially simultaneously with the opening of the mold, I provide exhaust nozzles 55 which may be similar in construction to the nozzles 53, and are arranged to extend through openings in the metal base, and through the bottom sheet of rubber, and into the layer of felt. Flexible piping 56 connects the exhaust nozzles 55 to atmosphere or to a suction pump or the like.

In carrying out my method, the metallic base is first arranged in place in the bottom mold member with the nozzles 53 and 55 extending through the holes provided in the base. A sheet of uncured rubber is then placed within the recess of the base. Next, a layer of felt or resilient material is placed within the recess on top of the sheet of uncured rubber. A second sheet of uncured rubber is then laid on top of the layer of felt with portions of the sheet extending beyond the edges of the layer of felt and overlapping the marginal portions of the metallic base. Upon the closing of the mold, the nozzles 53 and 55 pierce the bottom sheet of rubber and extend into the layer of felt. Fluid pressure is supplied by the nozzles 53 substantially simultaneously with the closing of the mold. The edge portions of the top sheet of rubber are pressed into air-tight sealing engagement with the marginal portions of the metallic base so that this fluid pressure is confined within the space occupied by the felt. This confined pressure holds the top sheet of rubber upwardly against the top mold member and also holds the bottom sheet of rubber against the bottom of the recess in the metallic base, so that these sheets may be properly vulcanized without causing matting of the yielding material. When the vulcanizing of the rubber has been completed, the confined pressure is relieved substantially simultaneously with the opening of the mold.

It will now be readily seen that I have provided a novel form of composite article in which the rubber covering of a cushion-like pad is simultaneously vulcanized and attached to a layer of yielding material and to a metallic base in such a way as to prevent matting of the fibers of the yielding material. In the articles constructed according to my invention, the bottom sheet of rubber connects the layer of felt to the metallic base and prevents movement of the felt relative to the base. The top sheet of rubber likewise prevents movement of the felt, and also by its attachment to the metallic base provides an airtight enclosure for the layer of yielding material. When the layer of yielding material of a cushion-like pad is completely encased in this manner, dust and moisture cannot reach the yielding material, and furthermore since air cannot escape from the article when the pad is compressed, the resiliency of the yielding material will be preserved indefinitely.

In the specification and claims, I have employed the word "felt" to designate a suitable yielding and insulating material which may be used in the cushion-like pad, and by this term I mean any of the commercial felts formed of matted fibers, such as jute, either with or without a strip of burlap or other woven material incorporated therein.

While I have illustrated and described the method and the articles of my invention in a detailed manner, it should be understood, however, that I do not intend to limit myself to the precise details and steps of procedure described, but regard my invention as including such changes and modifications as do not involve a departure from the spirit of the invention and scope of the appended claims.

Having thus described my invention, what I claim is:

1. A cushioned seat comprising a metallic base having a recess therein, and a cushioning pad in the recess and attached to the base, said cushioning pad comprising upper and lower layers of rubber and an intermediate layer of cushioning material, both the upper and lower layers of rubber being attached to said cushioning material, whereby the latter is held from creeping in the recess.

2. A seat comprising a metal base with a recess therein and with an upstanding marginal portion, and a cushioning pad in the recess, said pad comprising upper and lower layers of rubber and an intermediate layer of cushioning material, both layers of rubber being attached to said cushioning material and the upper layer of rubber being attached to the upstanding marginal portion of the base.

3. A seat comprising a metal base with a recess therein and with an upstanding marginal portion, and a cushioning pad in the recess, said pad comprising upper and lower layers of rubber and an intermediate layer of cushioning material, both layers of rubber being attached to said cushioning material and the lower layer being attached to the bottom of the recess and the upper layer being attached to the upstanding marginal portion of the base.

4. A composite structure comprising a metal base having a pan-like depression therein and also having an upstanding marginal portion provided with a down-turned flange, and a cushioning pad in said depression, said pad comprising upper and lower layers of rubber and an intermediate layer of cushioning material, both layers of rubber being attached to said cushioning material and the lower layer being attached to the bottom of the depression and the upper layer being attached to said upstanding portion and to said down-turned flange.

BUDD BRONSON.